(12) United States Patent
Van Meerveld et al.

(10) Patent No.: US 10,920,028 B2
(45) Date of Patent: Feb. 16, 2021

(54) PLEXIFILAMENTARY SHEETS

(71) Applicant: DUPONT SAFETY & CONSTRUCTION, INC., Wilmington, DE (US)

(72) Inventors: Jan Van Meerveld, Remich (LU); Corneille Schmitz, Aywaille (BE); Joseph Mathieu, Esch-sur-Alzette (LU); Noel Stephen Brabbs, Garnich (LU); Orest Skoplyak, Newark, DE (US); Christine Lemoine, Waldbredimus (LU); Serge Rebouillat, Echenevex (FR)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 419 days.

(21) Appl. No.: 14/740,824

(22) Filed: Jun. 16, 2015

(65) Prior Publication Data
US 2015/0368416 A1 Dec. 24, 2015

Related U.S. Application Data

(60) Provisional application No. 62/013,820, filed on Jun. 18, 2014.

(51) Int. Cl.
*B32B 5/02* (2006.01)
*D01F 6/04* (2006.01)
(Continued)

(52) U.S. Cl.
CPC ............... *C08J 5/18* (2013.01); *B32B 5/022* (2013.01); *B32B 27/12* (2013.01); *B32B 27/32* (2013.01);
(Continued)

(58) Field of Classification Search
CPC ......... C08J 5/18; C08J 2323/06; B32B 5/022; B32B 27/32; B32B 2307/718; B32B 2419/00; B32B 2307/7246; B32B 2307/7265; D01D 5/11; D01D 5/00; D01F 6/04; D04H 3/007; D04H 3/14; D04H 3/16; D04H 1/724; D04H 3/166; D04H 1/72; E04B 1/625
See application file for complete search history.

(56) References Cited

U.S. PATENT DOCUMENTS 2,004,241 A 6/1935 Hamilton
3,227,794 A 1/1966 Anderson et al.
(Continued)

FOREIGN PATENT DOCUMENTS

JP H05263310 A * 10/1993

OTHER PUBLICATIONS

"Nonwoven and Web Definitions." Complete Textile Glossary. New York, NY: Celanese Acetate, 2001. N. pag. Print. (Year: 2001).*
(Continued)

*Primary Examiner* — Laura C Powers
*Assistant Examiner* — Larissa Rowe Emrich

(57) ABSTRACT

A sheet having a plexifilamentary structure with a normalized Frazier air permeability of between 0.002 and 0.2 (m$^3$/m$^2$·minute)@50 gsm, and a normalized hydrohead of between 150 and 250 centimeters@50 gsm.

8 Claims, 1 Drawing Sheet

(51) Int. Cl.
*D04H 3/007* (2012.01)
*D04H 3/16* (2006.01)
*B32B 27/12* (2006.01)
*B32B 27/32* (2006.01)
*C08J 5/18* (2006.01)
*D01D 5/11* (2006.01)
*D04H 3/14* (2012.01)
*E04B 1/62* (2006.01)

(52) U.S. Cl.
CPC ............... *D01D 5/11* (2013.01); *D01F 6/04* (2013.01); *D04H 3/007* (2013.01); *D04H 3/14* (2013.01); *D04H 3/16* (2013.01); *B32B 2307/718* (2013.01); *B32B 2307/7246* (2013.01); *B32B 2307/7265* (2013.01); *B32B 2419/00* (2013.01); *C08J 2323/06* (2013.01); *E04B 1/625* (2013.01); *Y10T 428/31938* (2015.04)

(56) References Cited

U.S. PATENT DOCUMENTS

| | | | |
|---|---|---|---|
| 3,427,376 A | 2/1969 | Dempsey | |
| 3,478,141 A | 11/1969 | Dempsey et al. | |
| 3,532,589 A | 10/1970 | David | |
| 3,860,369 A | 1/1975 | Brethauer et al. | |
| 5,972,147 A | 10/1999 | Janis | |
| 5,977,237 A * | 11/1999 | Shin | D01D 5/11 264/172.16 |
| 6,004,672 A * | 12/1999 | Shin | D01D 5/11 428/364 |
| 6,117,801 A * | 9/2000 | McGinty | D01D 5/11 442/339 |
| 6,303,682 B1 * | 10/2001 | Shin | D01D 5/11 524/462 |
| 6,355,333 B1 * | 3/2002 | Waggoner | E04B 1/62 428/174 |
| 6,610,369 B2 | 8/2003 | Kauschke et al. | |
| 7,744,989 B2 | 6/2010 | Marin et al. | |
| 2003/0032355 A1 | 2/2003 | Guckert et al. | |
| 2006/0084346 A1 * | 4/2006 | Rollin, Jr. | D01D 5/11 442/417 |

OTHER PUBLICATIONS

"JPH05263310_Machine Translation" is a machine translation of JPH05-263310. (Year: 1993).*

* cited by examiner

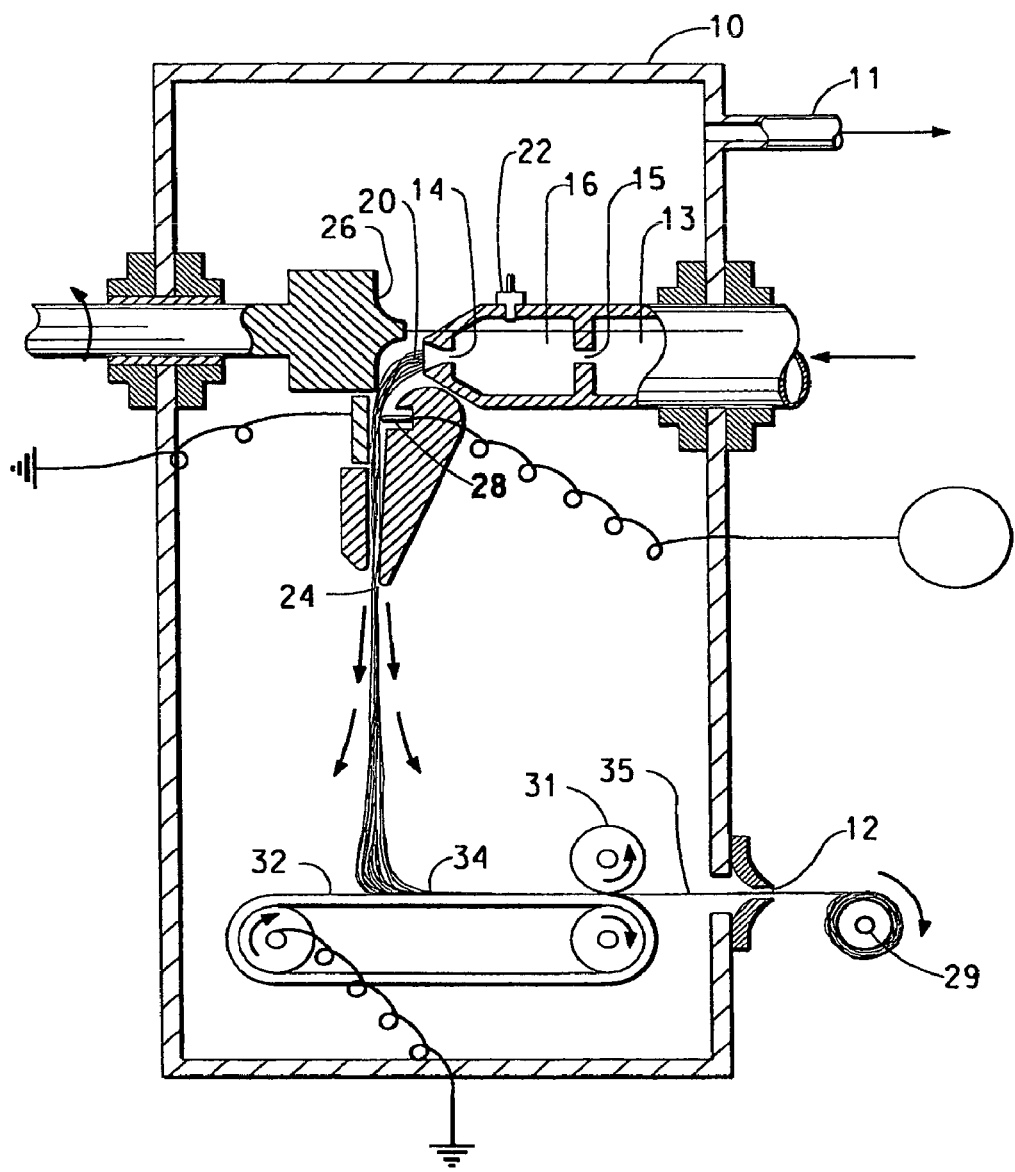

PLEXIFILAMENTARY SHEETS

FIELD OF THE INVENTION

This invention relates to flash-spun plexifilamentary sheets or fabrics suited for home wrap, protective apparel, and other end use applications in which a sheet or fabric must demonstrate both good barrier properties and a low air permeability.

BACKGROUND OF THE INVENTION

House wrap is used to wrap the exterior surface of a house or other building during its construction and, more particularly, after attachment of sheathing and prior to installation of siding/cladding.

House wrap commonly comprises a barrier layer which provides a moisture barrier against outside water or moisture, yet allows water vapor transmission from the interior of the housing. In this manner, the passage of liquid water and air (e.g., rain and wind) into the building structure is restricted, thereby preventing water damage to insulation and structural members and minimizing air movement within the walls. At the same time, water vapor which enters the walls from the interior of the building structure can exit so that it does not condense within the wall and potentially damage insulation and structural members. Typical house wrap barrier materials include spunbonded high density polyethylene fibers sold under the trade designation "DuPont™ Tyvek® HomeWrap®" by E.I. Du Pont de Nemours and Company, Wilmington, Del.; non-woven barrier material sold under the trade designation "DuPont™ Tyvek® CommercialWrap®" by E.I. Du Pont de Nemours and Company. Wilmington, Del.; high density, cross-laminated microperforated polyethylene sheet material sold under the trade designation "Rufco-wrap" by Raven Industries, Inc., Sioux Falls, S. Dak.; and the cross-woven microperforated polyolefin sheet materials sold by Amoco Foam Products Company, Atlanta. Ga., and Fabrene Inc., Mississauga, Ontario, Canada under the trade designations "Amowrap Housewrap" and "Air-Gard® Housewrap," respectively.

House wrap needs a low Frazier air permeability but with still a high hydrohead. Accordingly, a need exists for providing a protective wrap that improves energy efficiency and protection against air infiltration and moisture build-up in buildings while satisfying newly implemented industry-wide energy and building code regulations. There is also a need for employing a protective wrap which meets or exceeds the newly implemented code requirements on existing framing structures or openings and/or without increasing the wall profile of a building.

SUMMARY OF THE INVENTION

The present invention is directed to a sheet having a normalized Frazier air permeability of between 0.002 and 0.2 $m^3/m^2 \cdot minute@50$ grams per square meter (gsm), and a normalized hydrohead of between 150 and 250 cm@50 gsm.

A further embodiment of the invention has a BET surface area of at least 9 $m^2/g$, In a still further embodiment, the sheet has a normalized Frazier air permeability of less than or equal to 0.09 $m^3/m^2 \cdot minute@50$ gsm. The sheet may also have a normalized Frazier air permeability of greater than or equal to 0.0075 $m^3/m^2 \cdot minute@50$ gsm.

In a still further embodiment, the sheet has a normalized hydrohead of between 165 and 208 cm@50 gsm.

In a still further embodiment, the sheet has a BET surface area of between 9 and 25 $m^2/g$, or even a BET surface area of between 9 and 20 $m^2/g$.

The sheet may also have a basis weight of greater than or equal to 30 grams per square meter.

The invention is further directed to a multilayer structure comprising a multiplicity of two or more sheets wherein at least one sheet is a sheet comprising a plexifilamentary structure having a normalized Frazier air permeability of between 0.002 and 0.2 $m^3/m^2 \cdot minute@50$ gsm,
 I. a normalized hydrohead of between 150 and 250 cm@50 gsm, and
 II. a basis weight of greater than or equal to 30 gsm.

A further embodiment of the multilayer structure of the invention has a BET surface area of at least 9 $m^2/g$,

BRIEF DESCRIPTION OF THE DRAWINGS

FIG. 1 shows a schematic, not to scale, cross sectional view of a spin cell illustrating a process for making flash-spun plexifilamentary sheets.

DETAILED DESCRIPTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyethylene" as used herein is intended to encompass not only homopolymers of ethylene, but also copolymers wherein at least 85% of the recurring units are ethylene units.

The terms "nonwoven fabric", "nonwoven sheet" or "nonwoven web" as used herein mean a structure of individual fibers or threads that are positioned in a random manner to form a planar material without an identifiable pattern, such as would be seen in a knitted fabric.

As used herein, the "machine direction" is the long direction within the plane of a sheet, i.e., the direction in which the sheet is produced. The "cross direction" is the direction within the plane of the sheet that is perpendicular to the machine direction.

The term "plexifilamentary" as used herein, means a three-dimensional integral network of a multitude of thin, ribbon-like, film-fibril elements of random length and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "spin fluid" refers to the total composition that is spun using the spinning apparatus described herein. Spin fluid includes polymer and spin agent.

The term "spin agent" refers to the processing medium or mixture of media that is used to initially dissolve the polymer to form the spin fluid.

By "consisting essentially of" means herein that the claimed item contains a preponderance of a component, but may contain other items that are added to improve or modify the claimed item's functional performance. For example an item that consists essentially of polyethylene may also contain fillers, antioxidants, and other additives that modify its performance or function.

Test Methods

In the description, examples, and claims, the following test methods were employed to determine various reported characteristics and properties. ASTM refers to the American Society for Testing and Materials, and TAPPI refers to the Technical Association of the Pulp and Paper Industry.

The BET surface area of the plexifilamentary film-fibril web product is another measure of the degree and fineness of fibrillation of the flash-spun product. Surface area is measured by the BET nitrogen absorption method of S. Brunauer, P. H. Emmett and E. Teller, J. Am. Chem. Soc., V. 60 p 309-319 (1938) and is reported as $m^2/g$. BET surface area is measured using a Quantachrome model NOVA 3000e.

Basis Weight was determined by ASTM D-3776, which is hereby incorporated by reference, and is reported in $g/m^2$ or gsm. The basis weights reported for the examples below are each based on an average of at least twelve measurements made on the sample.

Gurley Hill (or just "Gurley") Porosity is a measure of the permeability of the sheet material for gaseous materials. In particular, it is a measure of how long it takes a volume of gas to pass through an area of material wherein a certain pressure gradient exists. Gurley Hill porosity is measured in accordance with TAPPI T-460 OM-88 using a Lorentzen & Wettre Model 121D Densometer. This test measures the time required for 100 cubic centimeters of air to be pushed through a 28.7 mm diameter sample (having an area of one square inch) under a pressure of approximately 1.21 kPa (4.9 inches) of water. The result is expressed in seconds that are frequently referred to as Gurley Seconds.

Frazier air permeability is a measure of air permeability of porous materials and is reported in units of $ft^3/min$ per $ft^2$. Frazier air permeability is measured in accordance with ASTM D737-04. It measures the volume of air flow through a material at a differential pressure of 0.5 inches water column (equivalent to 124.5 Pa). An orifice is mounted in a vacuum system to restrict flow of air through sample to a measurable amount. The size of the orifice depends on the porosity of the material. Frazier air permeability, which is also referred to as Frazier porosity, is measured using a Sherman W. Frazier Co. dual manometer with calibrated orifice units in $ft^3/(ft^2\ min)$, which were converted to $m^3/(m^2\ min)$ for purposes of reporting here. Frazier is reported here as normalized to 50 grams per square meter (gsm) of basis weight. If only the Gurley Air Porosity was measured on a sample, the Frazier was calculated according to the following equation:

$$\text{Frazier } (m^3/m^2\ min) \times \text{Gurley Air Porosity (seconds)} = 0.945.$$

To facilitate comparison of the Frazier of sheet of different basis weight it is convenient to normalize the Frazier to a sheet with a basis weight of 50 gram per square meter. The normalized Frazier for a basis weight of 50 gram per square meter is determined for the following relationship:

$$\text{normalized Frazier}\left[\frac{m^3}{m^2\ min}\right]@50\ \text{gsm} = \text{Frazier}\left[\frac{m^3}{m^2\ min}\right] \times \frac{\text{basis weight [gsm]}}{50\ \text{gsm}}$$

Hydrostatic Head (or hydrohead) is a measure of the resistance of the sheet to penetration by liquid water under a static load. A 7 inch×7 inch (17.78 cm×17.78 cm) sample is mounted in a SDL 18 Shirley Hydrostatic Head Tester (manufactured by Shirley Developments Limited, Stockport, England). Water is pumped against one side of a 102.6 cm section of the sample which is supported by a 30 mesh scrim with wires having a diameter of about 0.28 mm at a rate of 60+/−3 cm/min until three areas of the sample are penetrated by the water. The hydrostatic pressure is measured in inches, converted to SI units and given in centimeters of static water head. The test generally follows ASTM D 583 (withdrawn from publication November, 1976).

Hydrohead is reported here as normalized to a basis weight of 50 gram per square meter according to the following equation:

$$\text{normalized hydrohead [cm]}@50\ \text{gsm} = \text{hydrohead [cm]} \times \frac{50\ \text{gsm}}{\text{basis weight [gsm]}}$$

Embodiments of the Invention

The present invention is directed to a sheet comprising a plexifilamentary structure, the sheet having a normalized Frazier air permeability of between 0.002 and 0.2 $m^3/m^2$·minute@50 gsm, and a normalized hydrohead for a basis weight of 50 gram per square meter of between 150 and 250 cm@50 gsm. The terminology "@50 gsm" refers to the normalization procedures given above, where a measurement for any arbitrary basis weight is normalized to 50 gsm.

In a further embodiment the sheet consists essentially of polyethylene.

In a still further embodiment the BET surface area of the sheet is at least 9 $m^2/g$ In a further embodiment, the sheet has a normalized Frazier air permeability of less than or equal to 0.09 $m^3/(m^2\ minute)@50$ gsm. The sheet may also have a normalized Frazier air permeability of greater than or equal to 0.0075 $m^3/m^2$·minute@50 gsm.

In a still further embodiment, the sheet has a normalized hydrohead of between 165 and 208 cm@50 gsm.

In a still further embodiment, the sheet has a BET surface area of between 9 and 25 m²/g, or even a BET surface area of between 9 and 20 m²/g.

The sheet may also have a basis weight of greater than or equal to 30 grams per square meter.

In a further embodiment the flash spun plexifilamentary fiber strand of any of the embodiments described herein may be consolidated into a sheet structure. This sheet structure may then be optionally thermally or mechanically bonded.

The invention is further directed to a multilayer structure comprising a multiplicity of two or more sheets wherein at least one sheet is a polyethylene sheet comprising a plexifilamentary structure having I. a normalized Frazier air permeability of between 0.002 and 0.2 m³/m²·minute@50 gsm,
II. a normalized hydrohead of between 150 and 250 cm@50 gsm, and
III. a basis weight of greater than or equal to 30 grams per square meter (gsm).

A further embodiment of the multilayer structure of the invention comprises a plexifilamentary sheet having a BET surface area of at least 9 m²/g, The process for making flash-spun plexifilamentary sheets, and specifically Tyvek® spunbonded olefin sheet material, was first described in U.S. Pat. No. 3,081,519 to Blades et al. (assigned to DuPont.) The '519 patent describes a process wherein a solution of polymer in a liquid spin agent that is not a solvent for the polymer below the liquid's normal boiling point, at a temperature above the normal boiling point of the liquid, and at autogenous pressure or greater, is spun into a zone of lower temperature and substantially lower pressure to generate plexifilamentary film-fibril strands. As disclosed in U.S. Pat. No. 3,227,794 to Anderson et al. (assigned to DuPont), plexifilamentary film-fibril strands are best obtained using the process disclosed in Blades et al. when the pressure of the polymer and spin agent solution is reduced slightly in a letdown chamber just prior to flash-spinning.

The general flash-spinning apparatus chosen for illustration of the present invention is similar to that disclosed in U.S. Pat. No. 3,860,369 to Brethauer et al., hereby incorporated by reference. A system and process for flash-spinning a fiber-forming polymer is fully described in U.S. Pat. No. 3,860,369, and is shown in FIG. 1. The flash-spinning process is normally conducted in a chamber 10, sometimes referred to as a spin cell, which has a spin agent removal port 11 and an opening 12 through which nonwoven sheet material produced in the process is removed. A spin fluid, comprising a mixture of polymer and spin agent, is provided through a pressurized supply conduit 13 to a spinning orifice 14. The spin fluid passes from supply conduit 13 to a chamber 16 through a chamber opening 15. In certain spinning applications, chamber 16 may act as a pressure letdown chamber wherein a reduction in pressure causes phase separation of the spin fluid, as is disclosed in U.S. Pat. No. 3,227,794 to Anderson et al. A pressure sensor 22 may be provided for monitoring the pressure in the chamber 16.

The spin fluid in chamber 16 next passes through spin orifice 14. It is believed that passage of the pressurized polymer and spin agent from the chamber 16 into the spin orifice generates an extensional flow near the approach of the orifice that helps to orient the polymer. When polymer and spin agent discharge from the orifice, the spin agent rapidly expands as a gas and leaves behind fibrillated plexifilamentary film-fibrils. The gas exits the chamber 10 through the port 11. Preferably, the gaseous spin agent is condensed for reuse in the spin fluid.

The polymer strand 20 discharged from the spin orifice 14 is conventionally directed against a rotating deflector baffle 26. The rotating baffle 26 spreads the strand 20 into a more planar structure 24 that the baffle alternately directs to the left and right. As the spread fiber strand descends from the baffle, the fiber strand is electrostatically charged so as to hold the fiber strand in a spread open configuration until the fiber strand 24 reaches a moving belt 32. The fiber strand 24 deposits on the belt 32 to form a sheet 34. The belt is grounded to help ensure proper pinning of the charged fiber strand 24 on the belt. The fibrous sheet 34 may be passed under a roller 31 that compresses the sheet into a lightly consolidated sheet 35 formed with plexifilamentary film-fibril networks oriented in an overlapping multi-directional configuration. The sheet 35 exits the spin chamber 10 through the outlet 12 before being collected on a sheet collection roll 29.

A "thermally consolidated" or "thermally bonded" sheet is a sheet made by thermal consolidation of a web of the invention. Some examples of thermal bonding processes are through gas bonding, steam entanglement, ultra-sonic bonding, stretched bonding, hot calendaring, hot roll embossing, hot surface bonding.

Thermal surface bonding can be performed by a process as described in U.S. Pat. No. 3,532,589 to David for hard bonded surfaces. In this process the plexifilamentary sheet passes subsequently over a heated drum—cooling drum—heating drum—cooling drum to thermally bond both sides of the material. The heating drum is kept at a temperature that would result in partial melting of the plexifilamentary structure to include the bonding of the sheet. The cooling drum has the purpose to reduce the temperature to a value where the sheet will not shrink nor distort when unrestrained. During the bonding process the sheet is slightly compressed by a flexible belt to have a controlled shrinkage.

Alternatively, the plexifilamentary sheet may be bonded by means of embossing rolls and rubber coated back-up roll to bond one or two sides of the sheet. The embossing roll can be smooth or contain different patterns, for example, but not limited to those shown in the following references, namely a point pattern (U.S. Pat. No. 3,478,141, U.S. Pat. No. 6,610,390 US 2004/241399 A1), a rib pattern (US2003/0032355 A1), a random pattern (U.S. Pat. No. 7,744,989) or different patterns (U.S. Pat. No. 5,964,742). The sheet may pass through one or multiple stations of an embossing roll with rubber coated back-up roll. In addition, before and after the pairs of embossing and back-up rolls the sheet may be in contact with pre-heat or cooling rolls as described in U.S. Pat. No. 5,972,147. Finally, the bonding process the material may be softened, for example, a button breaking device as described in U.S. Pat. No. 3,427,376 by Dempsey.

EXAMPLES

Spin fluids were prepared, flash-spun and formed into a consolidated sheet according to the process described in U.S. Pat. No. 3,860,369 and described above. The polymer concentrations reported in the examples were calculated as the weight percent of polymer based on the total spin fluid weight, where the total spin fluid weight includes the weight of polymer and of the spin agent.

Unless otherwise indicated, the plexifilamentary webs and sheets prepared in the present examples were flash-spun using a spin agent consisting of 81 weight percent dichloromethane and 19 weight percent 2,3-dihydrodecafluoropentane. Comparative examples were made with a spin agent comprising n-pentane. The sheet of the invention resulted from a flash spinning process conducted from an upstream pressure letdown chamber of at least 15 cm³ and a discharge pressure of 75 bar gauge minimum, yielding a fiber of 300 to 400 denier.

The polymer used in all of the examples was high density polyethylene having a melt index of 2.35 g/10 min (measured according to EN ISO 1133 at 190° C. and 5 kg load), and 24.5 g/10 min (measured according to EN ISO 1133 at 190° C. and 21.6 kg load) a density of 0.96 g/cm³ (measured according to EN ISO 1183). The polymer used in the comparative example was high density polyethylene having a melt index of 0.96 g/10 min (measured according to ASTM D 1238 at 190° C. and 2.16 kg load) and 34.4 g/10 min (measured according to ASTM D 1238 at 190° C. and 21.6 kg load).

Table 1 summarizes spinning conditions for the examples and comparative examples.

TABLE 1

| Sample | Polymer Concentration Weight Percent of Spin Fluid | Spin Pressure (barg) | Spin Fluid Temperature (° C.) |
|---|---|---|---|
| Example 1 | 12 | 85.5 | 195 |
| Example 2 | 14 | 76.0 | 190 |
| Example 3 | 13 | 83.0 | 190 |
| Comparative Example 1 | 17 | 76.0 | 192 |
| Comparative Example 2 | 17 | 81.1 | 194 |
| Comparative Example 3 | 17 | 85.6 | 198 |
| Comparative Example 4 | 17 | 90.6 | 200 |
| Comparative Example 5 | 17 | 90.9 | 201 |
| Comparative Example 7 | 21.3 | 40.0 | 180 |
| Comparative Example 8 | 17.1 | 67.9 | 190 |
| Comparative Example 9 | 17.9 | 59.7 | 185 |

Table 2 summarizes the properties of the flash spun plexifilamentary sheets that were obtained. Comparative examples 7 to 9 describe the normalized Frazier air permeability and normalized hydrohead@50 gsm for additional basis weight values. The BET surface area was not measured (n.m.).

TABLE 2

| Sample | Basis Weight (gsm) | Normalized Frazier Air Permeability (m³/m² · minute @ 50 gsm) | Normalized Hydrohead (cm @ 50 gsm) | BET Surface Area (m²/g) |
|---|---|---|---|---|
| Example 1 | 41.4 | 0.089 | 165 | 9.8 |
| Example 2 | 42.3 | 0.0075 | 174 | 18.5 |
| Example 3 | 41.0 | 0.016 | 208 | 13.0 |
| Comparative Example 1 | 61.0 | 0.013 | 104 | 21.6 |
| Comparative Example 2 | 60.0 | 0.018 | 105 | 19.1 |
| Comparative Example 3 | 61.7 | 0.04 | 95 | 15.4 |
| Comparative Example 4 | 60.7 | 0.065 | 100 | 15.4 |
| Comparative Example 5 | 59.7 | 0.065 | 101 | 13.7 |
| Comparative Example 7 | 66.5 | 0.0024 | 69.3 | n.m. |
| Comparative Example 8 | 40.7 | 0.076 | 106.8 | n.m. |
| Comparative Example 9 | 54.2 | 0.015 | 77.8 | n.m. |

None of the comparative examples achieve the hydrohead performance of the examples of the invention, which exhibit a unique combination of performance in terms of the selected comparison criteria of Table 2.

We claim:

1. A sheet comprising a plexifilamentary film-fibril network consisting of high density polyethylene in an overlapping multi-directional configuration, the sheet, as-produced from a spin cell, having a normalized Frazier air permeability of between 0.002 and 0.2 m³/m²·minute at 50 gsm, a BET surface area of between 9 and 20 m²/gm, and a normalized hydrohead of between 150 and 250 cm at 50 gsm wherein the plexifilamentary film-fibril network in an overlapping multi-directional configuration is flash-spun from a spin fluid comprising polymer and spin agent, the spin fluid temperature being 190° C. to 195° C., the spin agent consisting of dichloromethane and 2,3-dihydrodecafluoropentane, and the polymer concentration in the spin fluid being 12 to 14 weight percent.

2. The sheet of claim 1 wherein the sheet as-produced from the spin cell has a normalized Frazier air permeability of less than or equal to 0.09 m³/m²·minute at 50 gsm.

3. The sheet of claim 1 wherein the sheet as-produced from the spin cell has a Frazier air permeability of greater than or equal to 0.0075 m³/m²·minute at 50 gsm.

4. The sheet of claim 1 wherein the sheet as-produced from the spin cell has a normalized hydrohead of between 165 and 208 centimeters at 50 gsm.

5. The sheet of claim 1 wherein the sheet as-produced from the spin cell has a basis weight of greater than or equal to 30 grams per square meter.

6. A multilayer structure comprising a multiplicity of two or more sheets wherein at least one sheet is a sheet according to claim 1.

7. A thermally consolidated sheet made from sheet according to claim 1.

8. A multilayer structure comprising a multiplicity of two or more sheets wherein at least one sheet is a sheet according to claim 7.

\* \* \* \* \*